United States Patent
Luna

(10) Patent No.: US 12,143,503 B2
(45) Date of Patent: Nov. 12, 2024

(54) VERIFYING OWNERSHIP USING DECENTRALIZED VERIFICATION

(71) Applicant: Ping Identity International, Inc., Denver, CO (US)

(72) Inventor: David Luna, San Francisco, CA (US)

(73) Assignee: Ping Identity International, Inc., Denver, CO (US)

(*) Notice: Subject to any disclaimer, the term of this patent is extended or adjusted under 35 U.S.C. 154(b) by 138 days.

(21) Appl. No.: 17/956,706

(22) Filed: Sep. 29, 2022

(65) Prior Publication Data

US 2024/0113889 A1    Apr. 4, 2024

(51) Int. Cl.
| | |
|---|---|
| H04L 29/06 | (2006.01) |
| H04L 9/30 | (2006.01) |
| H04L 9/32 | (2006.01) |
| G06K 7/14 | (2006.01) |

(52) U.S. Cl.
CPC .............. *H04L 9/3247* (2013.01); *H04L 9/30* (2013.01); *G06K 7/1417* (2013.01)

(58) Field of Classification Search
CPC ........... H04L 9/3247; H04L 9/30; H04L 9/50; G06K 7/1417; G06F 21/10
See application file for complete search history.

(56) References Cited

U.S. PATENT DOCUMENTS

| | | | | |
|---|---|---|---|---|
| 2005/0283609 | A1* | 12/2005 | Langford | G06F 21/64 713/176 |
| 2011/0035486 | A1* | 2/2011 | Seolas | G06F 16/957 709/224 |
| 2016/0218881 | A1* | 7/2016 | Adams | H04L 9/3239 |
| 2017/0178072 | A1* | 6/2017 | Poornachandran | H04L 9/3236 |
| 2019/0163883 | A1* | 5/2019 | Savanah | H04L 9/0643 |
| 2020/0034945 | A1* | 1/2020 | Soundararajan | H04L 9/3271 |
| 2020/0358781 | A1* | 11/2020 | Edwards | H04L 63/102 |
| 2020/0382311 | A1* | 12/2020 | Bueno | H04L 63/168 |

OTHER PUBLICATIONS

Introducing the Keybase Filesystem, keybase.io, 12 pages, Sep. 18, 2022 (downloaded from https://web.archive.org/web/20220918065736/https://book.keybase.io/docs/files Jan. 10, 2024).

* cited by examiner

*Primary Examiner* — Yogesh Paliwal

(57) ABSTRACT

Disclosed is technology that verifies, in pairwise manner, proof of ownership-association of decentralized online resources owned by or affiliated with a single entity by visiting a first resource using a first location identifier, ingesting a first scannable image that contains a first plurality of assertions of ownership of online resources by a single entity and extracting a first public key of the first resource. The technology also visits a second resource using a second location identifier, ingests a second scannable image that contains a second plurality of assertions and extracts a second public key of the second resource. Then, the technology verifies, using the first public key, a signature from the first complementary assertion, verifies, using the second public key, a signature from the second complementary assertion, and determines, based on the pair of verifications, whether the first and second resources are owned by a single entity.

20 Claims, 7 Drawing Sheets

```
Encapsulated
Assertions 420

{
  owner : {
    addr : "twitch.tv/example",
    pub  : pub2
  },                                    422
  owns : [
    {
      private : false,
      addr : "twitter.com/example",
      data : priv3-signed("twitch.tv/
example")
    },                                  426a
    {
      private : false,
      addr : "example.co.uk",
      data : priv1-signed("twitch.tv/
example")
    },                                  424
    ...
  ]
}
```

Scannable image tagging R2 410

VERIFYING OWNERSHIP USING DECENTRALIZED VERIFICATION

RELATED CASE

This application is related to U.S. application Ser. No. 17/956,694 titled "Generating Ownership Tags For Decentralized Verification", filed 29 Sep. 2022. The related case is incorporated by reference herein for all purposes.

FIELD OF TECHNOLOGY

The disclosed technology provides, within a computer or digital data processing system, process, or apparatus for increasing a system's extension of protection of system hardware, software, or data from maliciously caused destruction, unauthorized modification, or unauthorized disclosure, or hijacking. This technology protects data processing systems, apparatus, and methods as well as information and services. This technology can include security policies, usage control, and data protection. This class also includes protection of hardware, and user protection, e.g., privacy, etc.

In particular, the disclosed technology relates to proving associations between resources in a manner that prevents hijacking and other misrepresentation of ownership or affiliation of a web site or resource. Specifically, the technology relates to generating evidence of affiliation or ownership among multiple resources on which a visitor can rely to verify the affiliation or ownership of the resources by a common entity. The technology also relates to providing publicly accessible containers that identify commonly controlled resources for exploration by users, consumers, or customers.

BACKGROUND

By design, the internet promotes a default state of anonymity. Online resources (which could be a webpage, a Twitch stream, a Facebook account, a YouTube channel) may purportedly be associated with a real-life person on the resource itself. However, just because a resource purports to be associated with an online persona does not mean it is necessarily true. The association could be the result of fraud or mistaken identity.

Prior art attempts to use online lookups for users to authenticate the purported owner or affiliate ("owner") of a resource, based on a centralized authority or infrastructure. Centralized authority or infrastructure presents a risk in that the centralized authority or infrastructure may be compromised. Additionally, using a centralized authority or infrastructure can be a chore. A centralized authority or infrastructure is unlikely to permit consumer exploration of associated resources that the consumer might be interested in.

Natural world resources (which could include tangible resources such as buildings, statues, shipping containers, etc.) may have a centralized authority that links the resource to a particular person, such as real property title records. However, the average consumer may not have convenient access to the centralized authority, and the natural world centralized authority may not easily relate the resource to other classes of resources.

An opportunity arises for a way to achieve decentralized verification that does not rely on a centralized authority to verify affiliation or ownership. Also, an opportunity arises to inform interested users of resources controlled or owned by the content provider.

BRIEF DESCRIPTION OF DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The disclosed technology involves generating image sets for commonly owned resources that can be interpreted using readily available user devices such as a smartphone with a camera. Pairs of images encode at least signed keys that can be cross-verified to prove common ownership. To prevent spoofing or hijacking, private keys in private/public key pairs are destroyed once the image sets have been created. This increases the cost of creating image sets, because private keys cannot be reused if the set changes. The destruction increases security because the image set effectively becomes immutable when the private keys are destroyed. Both mechanisms for creation of image sets and verifying common ownership from image pairs are described. An example environment is for the technology is discussed next.

Figure 1:
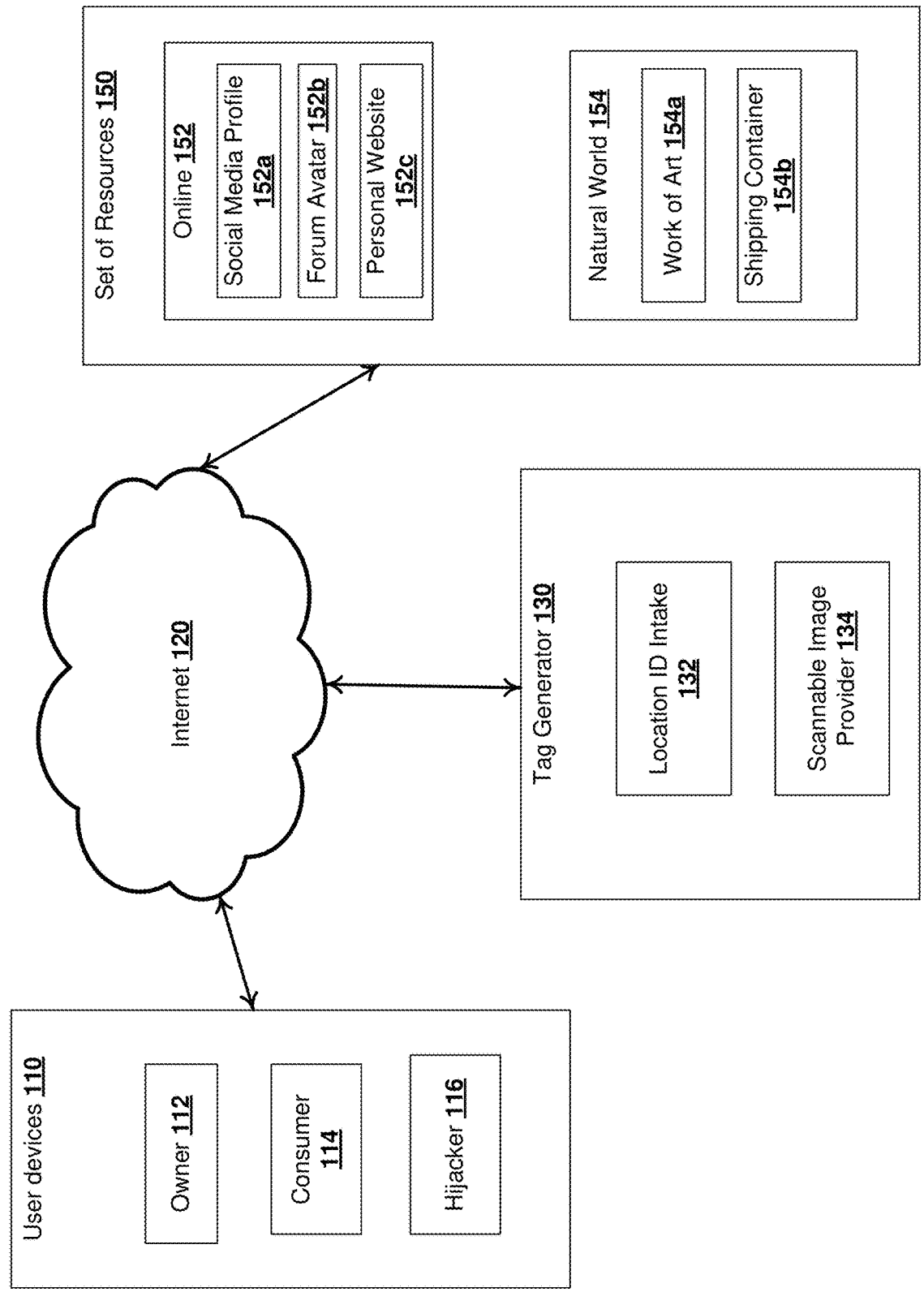
FIG. 1 illustrates an architectural level schematic of a system for generating ownership tags and decentralized verification of ownership tags in accordance with an implementation of the technology disclosed.

FIG. 1 illustrates an architectural level schematic of a system for generating ownership tags and decentralized verification of ownership tags in accordance with an implementation of the technology disclosed. Because FIG. 1 is an architectural diagram, certain details are intentionally omitted to improve clarity of the description. The discussion of FIG. 1 will be organized as follows. First, the elements of the figure will be described, followed by their interconnections. Then, the use of the elements in the system will be described in greater detail.

Architectural diagram 100 contains user devices 110, Internet 120 tag generator 130, online resources 150 and tangible resources 160. Users include owner 112, consumer 114, and hijacker 116. Owner 112 is the resource provider that wishes to prove that he or she owns a resource in a set of resources 150 being provided to consumer 114. Hijacker 116 wishes to spoof ownership of the resource in the set of resources. Tag generator 130 includes location identifier (ID) intake 132 and scannable image provider 134. Tag generator 130 may be hosted by an entity, such as an entity other than any of user devices 110. Location ID intake 132 accepts strings representing locations corresponding to respective resources in set of resources 150. The strings may be logical location IDs or physical location IDs. Elements in set of resources 150 may be drawn from online resource 152, natural world 154, or a combination thereof. Examples of online resources 152 include but are not limited to social media profiles 152a such as those from Facebook, Twitter, Twitch.tv, Discord, profiles on services 152b such as forum avatars, and personal websites 152c of users. Examples of natural world resources 154 include but are not limited to tangible artistic works 154a (e.g., graffiti on a wall, statues, portraits, etc.) and shipping containers (e.g. crates or boxes).

Continuing the description of FIG. 1, when owner 112 wishes to reliably assert ownership of a resource from set of resources 150 that owner 112 owns, owner 112 provides, or causes to be provided, location ID strings for that resource and the other resources in the set of resources through Internet 120 to tag generator 130. Owner 120 may provide the location ID strings via an application, an app, a browser plugin, or webpage with scripts. For some types of resources, tag generator may also require that owner 112 provides, or causes to be provided, independent verification of ownership.

Using resource logical locations, tag generator 130 generates and provides a scannable image. The scannable image may be a bar code, such as a linear bar code; a stacked bar code such as PDF417; a matrix bar code such as Data Matrix, Quick Response (QR) code, or Aztec code; a 3D barcode such as Just Another Bar (JAB) code or other color-bearing barcodes such as High Capacity Color Bar (HCCB) code. Another bar code, not listed explicitly herein, could be utilized in another implementation of the disclosed technology. Alternatively, another type of token could be generated for posting on a web page and triggering delivery of ownership authentication information on an interested party's mobile device or browser. As an example of other types of tokens, the technology could extend to any embedded data in an image (such as steganography), so long as there is a capture mechanism that can identify when there is a scannable tag embedded in that image.

The owner may use the scannable image to tag a resource and attest to common ownership of multiple resources.

Consumer 114 wishing to verify that a resource provider controls or owns a particular resource (for example, perhaps user is attempting to donate to the resource provider, and wants to confirm that a donation site that is allegedly controlled or owned by the resource provider is indeed controlled or owned by the resource provider) can scan and decode the image for the particular resource, access the signatures of and links to the associated resources, and visit one or more of the other resources to confirm they are owned or controlled by the same resource provider as the particular resource. A computer-implemented system performs pair-wise comparisons between the tags that have been posted on the resources.

Consumer 114 does not require to tag generator 130 or any other centralized authority to verify resources. Once the tags have been generated, no central authority is required for consumer 114 to verify common ownership.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same processors.

For example, although tag generation in tag generator 130 and a verification by consumer 114 are described and illustrated as occurring in separate devices, the functions could be combined in a single application or app without departing from the spirit of the disclosure.

Moreover, this technology can be implemented using two or more separate and distinct computer-implemented systems that cooperate and communicate with one another. This technology can be implemented in numerous ways, including as a process, a method, an apparatus, a system, a device, a computer-readable medium such as a computer-readable storage medium that stores computer-readable instructions or computer program code, or as a computer program product comprising a computer usable medium having a computer readable program code embodied therein. The technology disclosed can be implemented in the context of any computer-implemented system.

Any data structures and code described or referenced are stored according to many implementations on a computer readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

Figure 2:
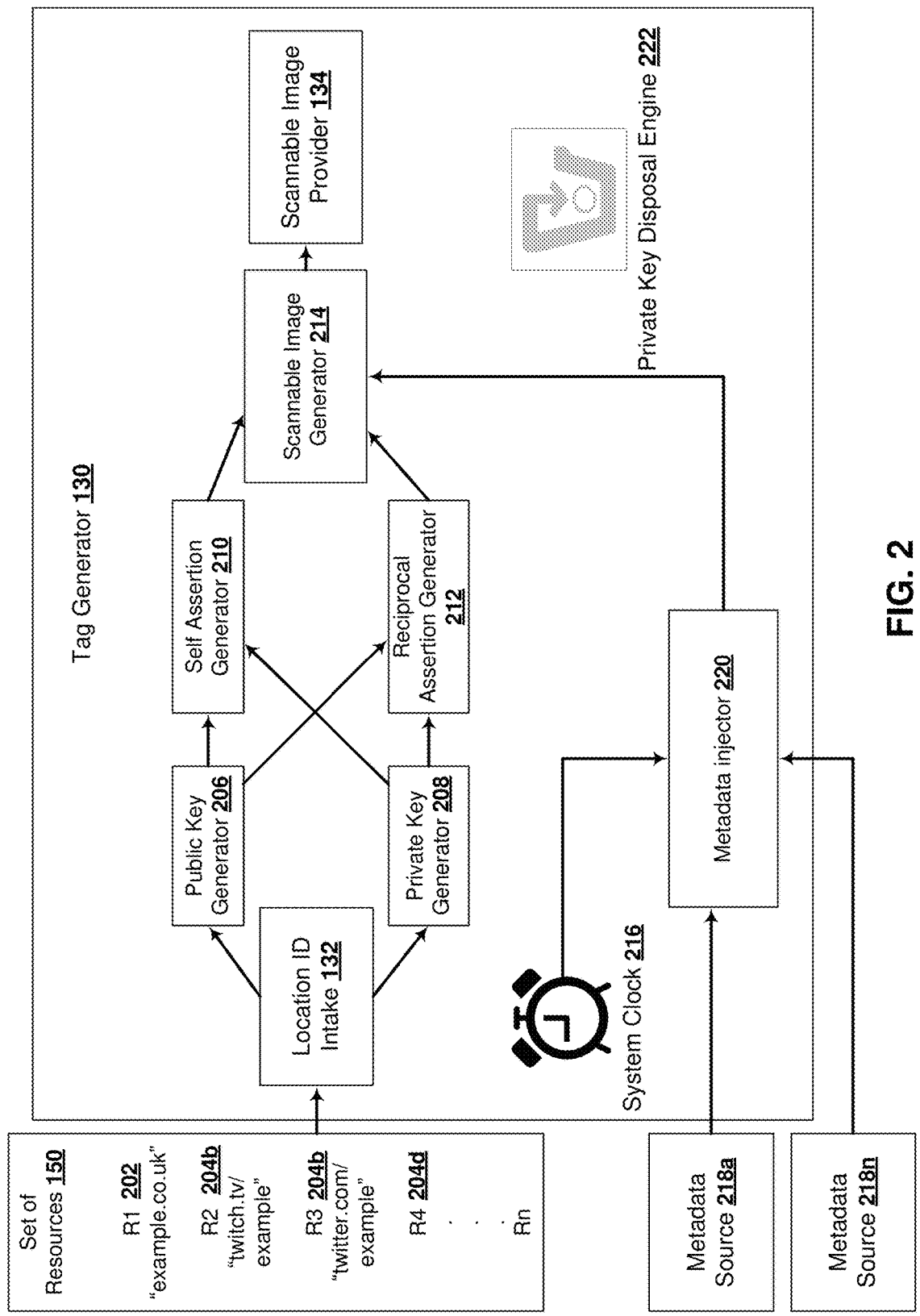
FIG. 2 illustrates an example system diagram for a tag generator that creates a set of scannable images asserting ownership for a set of resources.

FIG. 2 illustrates an example system diagram for a tag generator that creates a set of scannable images asserting ownership for a set of resources. System diagram 200 includes the previously described tag generator 130 including Location ID Intake 132, and scannable image 134; and set of resources 150. The components of 200 include a tag generator 130, public key generator 206, private key generator 208, self-assertion generator 210, reciprocal assertion generator 212, scannable image generator 214, system clock 216, metadata injector 220, private key disposal engine 222; and metadata sources 218a-n.

Set of resources 150 includes n resources, designated as $R_1$ through $R_n$. In this example, the first resource $R_1$ 202 is the resource that the resource provider currently wishes to prove ownership, aka "current resource." The second through $n^{th}$ resource $R_{2...n}$ 204b-204n are other resources that the resource provider also owns. The set of resources include a website with location ID string "example.co.uk," a Twitch™ stream with location ID string "twitch.tv/example," and a Twitter™ account with location ID string "twitter.com/example" Location identifiers related to set of resources 150 are input into location ID intake 132.

Location ID intake 132 is an input to tag generator 130 that accepts location identifiers that point to respective resources in set of resources 150. In FIG. 1, owner 112 accesses tag generator 130 and the location ID intake is at least part of an API that is exposed to Internet 120. Other input means also are contemplated. Other means of location ID intake include direct input into a server that facilitates an implementation of tag generator 130, pipe or redirect from an application, interprocess communication, and accessing location identifiers stored in a document accessible by tag generator 130.

Public key generator 206 and private key generator 208 take the location ID strings as input and generate public and private key pairs for each resource in set of resources 150. The key pairs are passed to self-assertion generator 210 and reciprocal assertion generator 212.

While public keys are posted in the scannable image or other token, private keys are discarded after the scannable image or token is created for the current resource.

Self-assertion generator 210 and reciprocal assertion generator 212 take public keys, private keys, and location ID strings as input. Self-assertion generator 210 generates an owner-assertion about current resource $R_1$ 202. The owner-assertion includes a location ID string of $R_1$ 202 and the public key of $R_1$ 202. The owner-assertion is provided to scannable image generator 214.

Reciprocal assertion generator 212 generates n−1 respective owns-assertions about resources $R_{2\ldots n}$. Each owns-assertion can include a signal as to whether the resource is publicly available or privately available (described in more detail further below), a location ID string for the respective resource, and a reference to $R_1$ that is signed by the respective resource's private key. The owns-assertions are provided to scannable image generator 214. These are discussed in more detail in reference to FIGS. 3, 4.

Scannable image generator 214 takes the assertions from self-assertion generator 210 and reciprocal assertion generator 212 as input, and optionally metadata from metadata injector 220 (further described below). Scannable image generator 214 creates a tag based on the assertions and generates a barcode image that encapsulates the tag. That scannable image is then made available to owner 112 through the scannable image provider 134 to use, for example, on the owner's web page resources.

System clock 216 provides a timestamp related to the scannable image. The timestamp may be optionally included as encapsulated metadata into the scannable image, in some implementations. For example, the timestamp could reflect when the location IDs for the respective resources in set of resources 150 were provided to tag generator 130. As another example, the timestamp could reflect when the image is generated.

Metadata source 218a-n can provide additional metadata for the generated tag. Although process 200 illustrates metadata source 218a-n as being external to tag generator 130, some metadata sources may be internal to tag generator 130. Here, clock 216 and metadata source 218a-n are used as input to metadata injector 220. Example metadata provided by metadata source 218a-n includes, but is not limited to, location data, expiration time, issuance time, and so forth.

Although the above system diagram 200 illustrates distinct parts of tag generator 130, it will be apparent to the skilled reader that the illustration is an example; different implementations may integrate illustrated elements into a single component, or may provide multiple instances. As some other examples, self assertion generator 210 and reciprocal assertion generator 212 may be a single component. The reciprocal assertion generator 212 may have multiple instances that generate reciprocal assertions in parallel. Colorable variations of the elements in system diagram 200 are encompassed by this disclosure.

The above description sets forth how to generate the first scannable image for $R_1$. In practice, owner 112 will tag all resources in the set of resources 150, and will repeat the process to generate tags asserting common ownership of $R_2$ through $R_n$. The next figure shows an encoded and decoded scannable image used to tag $R_1$.

Figure 3:
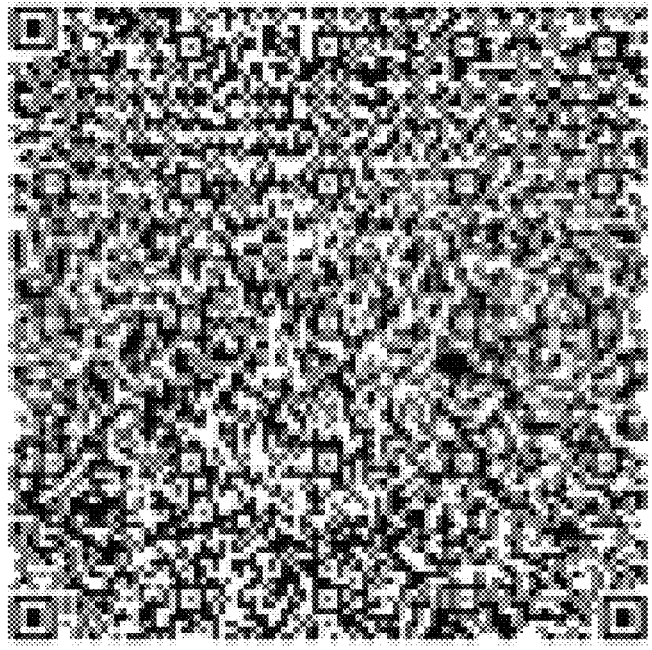
FIG. 3 illustrates the generated tag for resource $R_1$, shown as a QR code in this example.

FIG. 3 illustrates the generated tag for resource $R_1$, shown as a QR code in this example. Tag 300 is visually depicted as scannable image tagging $R_1$ 310, and informationally represents encapsulated assertions 320. Encapsulated assertions 320 include a single owner-assertion 322 and contained within owns-container 324, n−1 owns-assertions 326b-n.

Scannable image tagging $R_1$ is posted in connection with $R_1$. Since current resource $R_1$ is, in this example, a webpage of online resource 152, scannable image might be an image embedded in the webpage. In situations where the current resource is of natural world 154, the scannable image could be affixed to the current resource itself (such as an engraving on a yacht hull) or, where the current resource is an immobile resource (such as a mansion), the image may be posted in proximity to the immobile resource (such as a mailbox outside of the mansion). Owner-assertion 322 was generated by self-assertion generator 210. Owner-assertion 322 is an assertion of $R_1$ 202, containing an addr field with a logical location identifier, and pub field with a public key. Owns-container 324, which contains one or more than assertions, was generated by reciprocal assertion generator 212. Owns-container contains a set of assertions with set-elements 326b-n for resources $R_2$ through $R_n$. Each assertion contains the fields that describe whether the respective resource is publicly available (as opposed to private access to users with out-of-band agreement), the location ID string for the respective resource, and a location ID to $R_1$ that is signed by the respective resource's private key. Using assertion 326c as an example, the key from resource $R_2$ ("twitch.tv/example") is used to sign the location ID string of $R_1$ ("example.co.uk"). At the option of owner 112, various assertions 326b-n in owns-container 324 may have the "private" field of an assertion marked as "true." For assertions this flag is marked as such, the contents of the addr fields and data fields will be additionally encrypted, and application of secret key (which may be distributed out of band by owner 112 to one or more consumers 114) will be necessary to read the data. The encryption and secret key may be generated by any algorithm suitable for short message strings, such as OTP.

Figure 4:
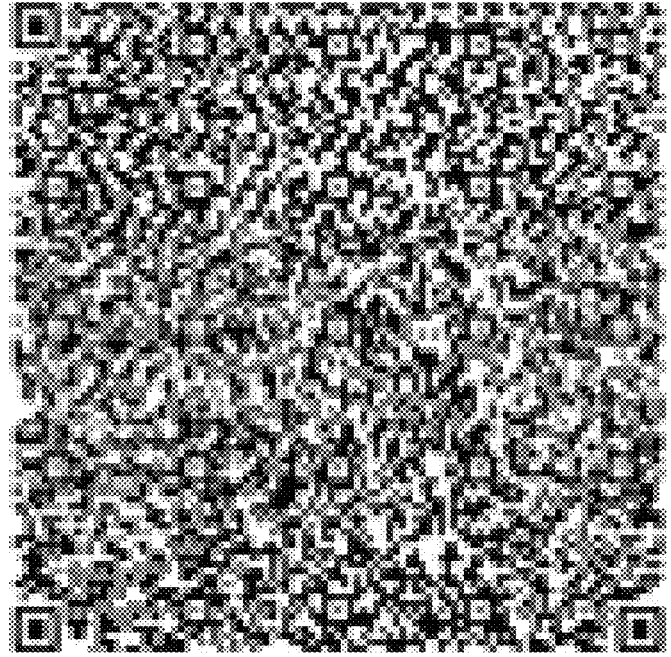
FIG. 4 illustrates the generated tag for resource $R_2$, showing an encoded and decoded scannable image used to tag $R_2$.

FIG. 4 illustrates the generated tag for resource $R_2$, showing an encoded and decoded scannable image used to tag $R_2$. Tag 400 is visually depicted as scannable image tagging $R_2$ 410, and encapsulates assertions 420. Encapsulated assertions 420 include a single owner-assertion 422 within owns-container 424. The fields as defined in owner assertion 422 and owns-container 424 parallel those in FIG. 3, owner-assertion 322 and owns-container 324, so our field descriptions are not repeated here. In FIG. 4, as opposed to FIG. 3, the include scannable image tagging $R_2$ 410 is posted in connection to $R_2$, not $R_1$; owner assertion 420 corresponds to resource $R_2$ and thus the public key corresponds to $R_2$, not $R_1$; and the owns-container does not include the assertion related to $R_2$, but instead includes the assertion related to $R_1$. The next figure shows a process for verifying ownership of $R_1$ by a visitor of $R_1$.

Figure 5:
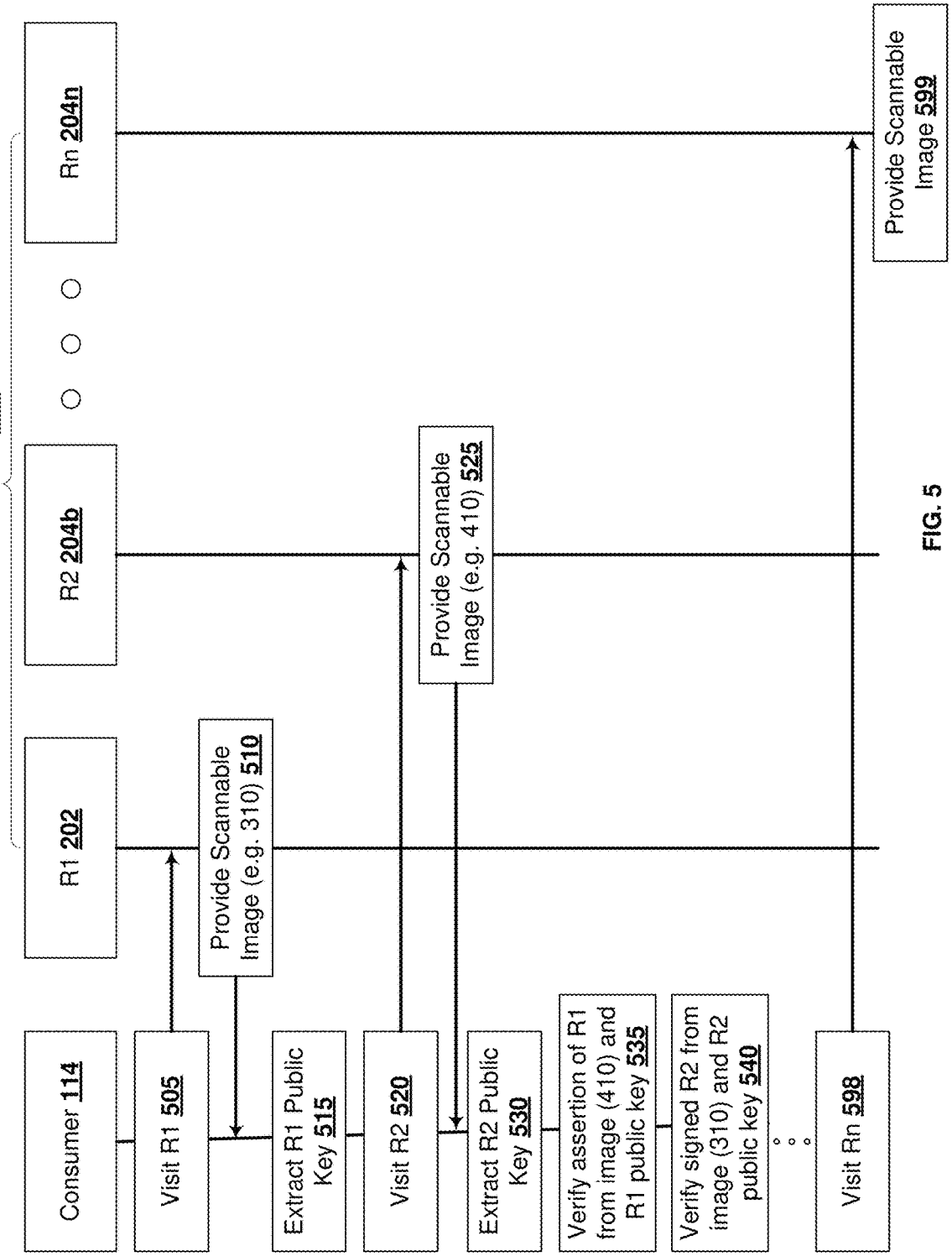
FIG. 5 illustrates a process that a consumer visiting $R_1$ uses to verify ownership of $R_1$, through use of pairwise comparisons with $R_2$ through $R_n$.

FIG. 5 is a message flow diagram of a consumer visiting $R_1$ and verifying ownership of $R_1$ through use of pairwise comparisons with $R_2$. The same process would apply to R 3 through $R_n$. In step 505, consumer 114 visits a first resource using a first location identifier. In step 510, $R_1$ 202 provides a first scannable image (for example, the image depicted in FIG. 3, 310) that contains a first plurality of assertions of online resources by a single entity, including a first self-assertion to resource $R_1$ and a second complementary assertion to a second resource including a second signed location identifier. Consumer 114 may use a smartphone with a camera to recognize and interpret barcodes, or use a standalone application/app, a web browser plugin, or other capture mechanisms. After consumer 114 has ingested the image provided by $R_1$ 202, consumer 114 is now aware of common-ownership claims to other resources $R_2$ through $R_n$ as well as ownership of $R_1$. In step 515, a first public key of $R_1$ 202 is extracted. In step 520, consumer 114 visits resource $R_2$ 204b using a second location identifier. The second location identifier may have been obtained from the first scannable image. The second location may have been otherwise obtained (e.g., prior knowledge of the resource, a third party, or other manners of having a location of resource 204b). Optionally, consumer 114 may choose to visit a resource that has the private field that marked as "true" if consumer 114 is in possession of a key that can be used to decrypt the corresponding data field, or indicates the same. If consumer 114 does not have such a key, consumer 114 must select a resource where the private field is marked as false, or indicates the requirement for having the key is false. In step 525, $R_2$ 204b provides, a second scannable image (for example, the image depicted in FIG. 4 element 410) that contains a second plurality of assertions, including a second self-assertion to the second resource and a first assertion to the first resource including a first location identifier. In step 530, a second public key of the second resource is extracted.

Continuing the description of the process, in step 535, consumer 114 verifies, using the first public key, the first complementary assertion. By hashing the first complimentary assertion with the first public key, the consumer should receive the location ID of the first resource. In step 540, consumer 114 verifies, using the second public key, the second complimentary assertion. Similarly, by hashing the second complimentary assertion with the second public key, the consumer should receive the location ID of the second resource. When the pair of verifications succeed (because steps 535 and 540 respectively return the location identifiers for $R_1$ 202 and $R_2$ 204b) consumer 114 has verified that the pair of resources are co-owned or otherwise affiliated. If consumer 114 does not obtain both location IDs, then the consumer may conclude that one of the resources may be controlled by a hijacker 116 and that the image was diverted from owner 112.

The pairwise verification process can be repeated between $R_1$ and other resources other than $R_2$ in resource set 150. Repeated success pairwise verification to enhance confidence by consumer 114 that owner 112 is indeed the owner of the set of resources. Consumer 114 need not be concerned that some third-party verification authority has been compromised, because consumer 114 was not at all required to consult with a third party to verify ownership.

Some of the steps above may be automated or semi-automated. For example, in an implementation of a web browser plugin as a capture mechanism, once a webpage has been downloaded, the plugin, rather than the user, could recognize that the downloaded webpage contains a scannable image tag, ingest the tag, visit other resources, and validate using the corresponding tags, all without user intervention. Other implementations may provide a mix of automation and manual user action.

It may not be practical to update tags corresponding to resources in the Natural World whenever a new resource is added to the body of resources. For such implementations, pairwise tagging can be used.

For example, if a graffiti artist wishes to establish ownership over his or her own body of work, the graffiti artist could include a tag that has an owner-assertion of the work of graffiti, and an owns container that refers to a web site.

The website could have a list of the artist's works and a reciprocal tag. When a new work is created, the website list updates with a new entry corresponding to the new work and new reciprocal tag.

The combination of self-assertion and reciprocal assertion thwarts hijacking. If a hijacker attempts to create a fake tag on an imposter resource by reusing or repurposing information from the tag from FIG. 3 on her own resource $R_{imposter}$, the falsification will be apparent to consumer 114 when attempting the pairwise comparison between $R_{imposter}$ and other resources that are owned by owner 112. The next Figure shows how the technology protects against such situations.

Figure 6:
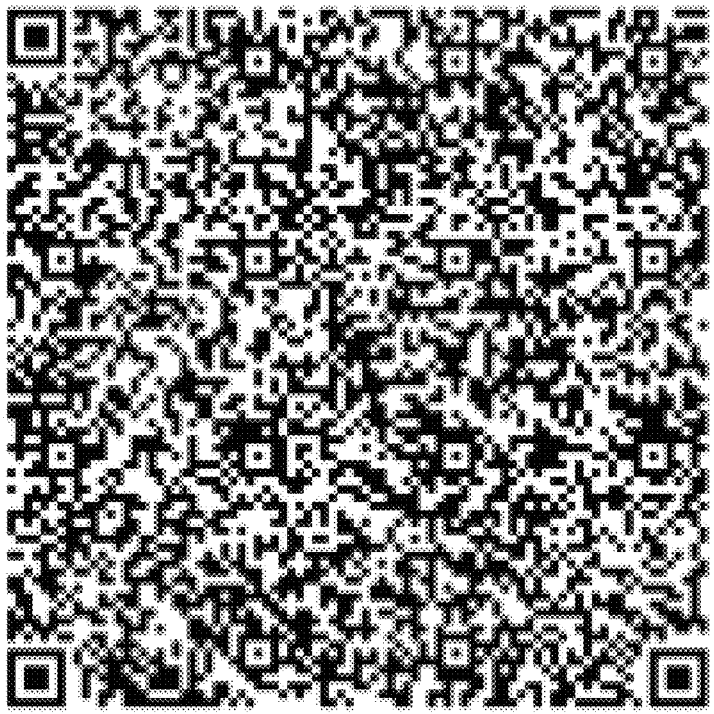
FIG. 6 illustrates a sophisticated attempt to falsify an assertion of online identity, shown as a QR code in this example.

FIG. 6 illustrates an attempt to falsify an assertion of online identity, with a hijacker's fake QR code. Fraudulent tag 600 is visually depicted as scannable image tagging $R_{imposter}$, and informationally represents encapsulated false assertions 620. Encapsulated false assertions 620 include a single owner-assertion 622 containing the public key of $R_1$ 626a, and owns-container 324 as originally posted on $R_1$.

Here, hijacker 116 wishes to confuse consumer 114 into interacting with $R_{imposter}$, not shown, by attesting that she is owner 112, who owns $R_2$ (twitch.tv/example) and R 3 (twitter.com/example). Thus, hijacker 116 alleges by using the donation mechanism hosted on $R_{imposter}$, consumer 114 is donating to owner 112. In reality, if consumer 114 donates, it is hijacker 116, not owner 112, who will benefit.

Fraudulent tag 600 shows the attempt to aid the deception by reusing significant portions of tag 300. Fraudulent tag 600 reuses owner assertions 320 (shown in FIG. 3) from an existing tag for $R_1$ 300 (shown in FIG. 3) and replace the addr field of owner assertion 320 with her own, and generates a QR code 610 to encode that new data.

When applying verification process 500 (shown in FIG. 5), this attack fails at step 535. The assertion of ownership in $R_2$ 426a (shown in FIG. 4) must be hashed against the public key $R_1$. Consumer 114 who does so will discover that the hash function fails.

The technology disclosed benefits the consumer. Firstly, the consumer can verify that the resource being accessed is actually owned by the resource provider. Secondly, the consumer is informed of other resources that are owned or controlled by the owner. After all, if the resource is of interest to the consumer, then other resources controlled or owned by the owner may similarly be of interest. When new scannable images are posted, the user has a perceptible benefit from careful review of the scannable image.

The technology benefits the owner. By asserting ownership or affiliation over online resources through the disclosed technology, the owner can assert an online identity and can also deepen existing relationships by providing more sources of content to the consumer, while avoiding free riding identity hijackers.

Computer System

Figure 7:
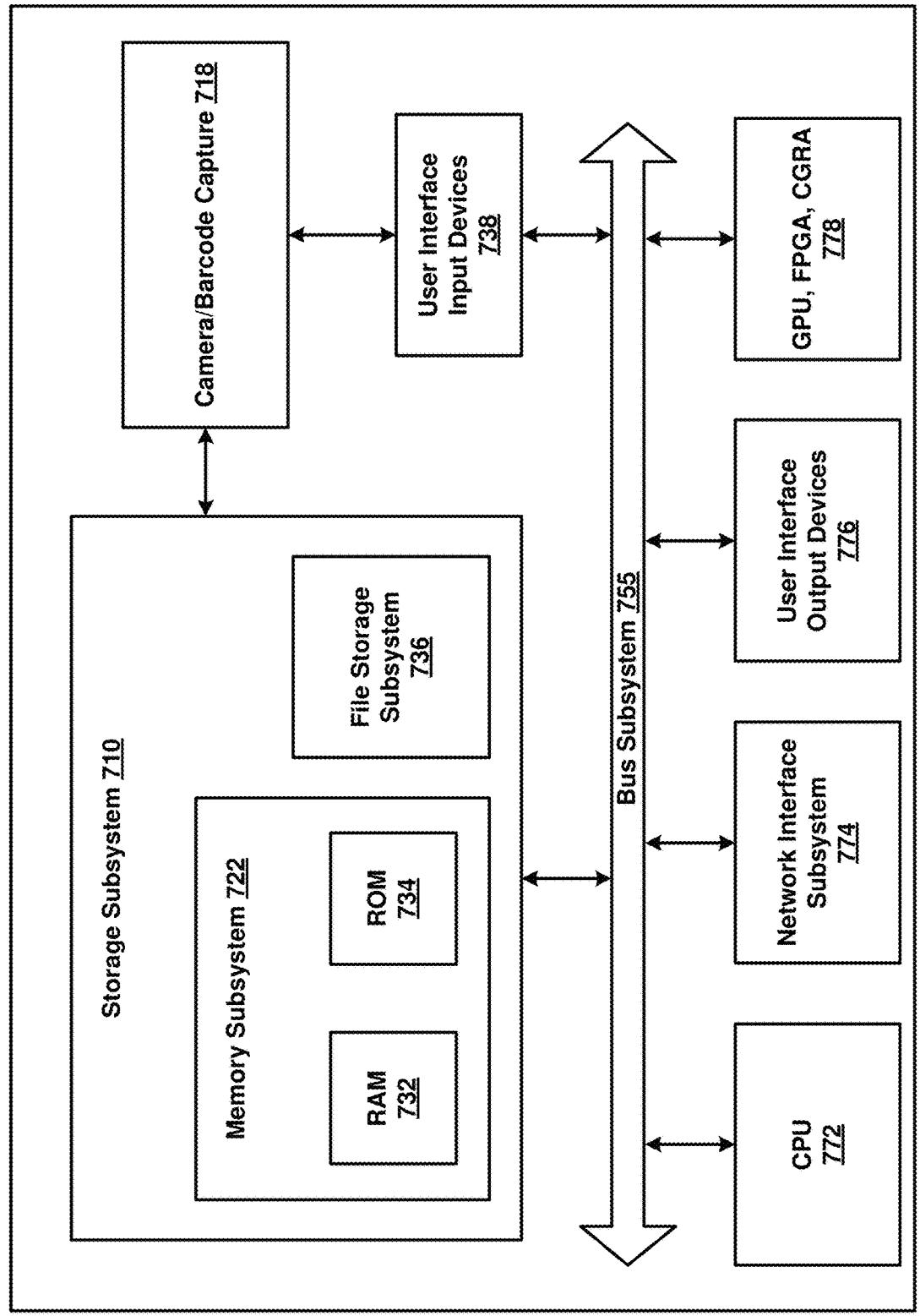
FIG. 7 illustrates an exemplary computer system that may be used to implement the technology.

FIG. 7 is a simplified block diagram of a computer system 700 that can be used for generation and decentralized verification of tags. Computer system 700 includes at least one central processing unit (CPU) 772 that communicates with a number of peripheral devices via bus subsystem 755, and tag generator 130 and/or set of resources 150 for providing generation and/or verification as described herein. These peripheral devices can include a storage subsystem 710 including, for example, memory devices and a file storage subsystem 736, user interface input devices 738, user interface output devices 776, and a network interface subsystem 774. The input and output devices allow user interaction with computer system 700. Network interface subsystem 774 provides an interface to outside networks, including an interface to corresponding interface devices in other computer systems.

In one implementation, token/barcode capture 718 is communicably linked to the storage subsystem 710 and the user interface input devices 738.

User interface input devices 738 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 700.

User interface output devices 776 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 700 to the user or to another machine or computer system.

Storage subsystem 710 stores programming and data constructs that provide the functionality of some or all of the modules and methods described herein. Subsystem 778 can be graphics processing units (GPUs) or field-programmable gate arrays (FPGAs).

Token/Barcode capture 718 can capture scannable images, such as Scannable Image 310 of FIG. 3 and Scannable Image 410 of FIG. 4. Token/Barcode capture could include a camera that captures a barcode using photographic techniques, or a laser that scans a writable medium such as paper, or a parser that extracts a barcode image embedded in an electronic document, or any other component that is usable of ingesting a barcode, including a combination of such components. Token/barcode capture 718 could also include receiving electronic tokens through networks such as NFCs or the Internet.

Memory subsystem 722 used in the storage subsystem 710 can include a number of memories including a main random access memory (RAM) 732 for storage of instructions and data during program execution and a read only memory (ROM) 734 in which fixed instructions are stored. A file storage subsystem 736 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 736 in the storage subsystem 710, or in other machines accessible by the processor.

Bus subsystem 755 provides a mechanism for letting the various components and subsystems of computer system 700 communicate with each other as intended. Although bus subsystem 755 is shown schematically as a single bus, alternative implementations of the bus subsystem can use multiple busses.

Computer system 700 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 700 depicted in FIG. 11 is intended only as a specific example for purposes of illustrating the preferred embodiments of the present invention. Many other configurations of computer system 700 are possible having more or less components than the computer system depicted in FIG. 11.

Particular Implementations

Some particular implementations and features for generating image tags are described in the following discussion.

In one disclosed implementation, the method includes:

generating resource references for a set of resources owned by or associated with an owning entity, the set of resources including online resources, obtaining private and public key pairs for respective resources in the set of resources, generating for posting on a current resource (such as $R_1$) a scannable image that encapsulates, the public key for the current resource and a set of assertions for each other resource (such as $R_{2-n}$) in the set of online resources, wherein each assertion for a respective resource includes a signed reference to the current resource that is generated using the private key of the respective resource (such as $R_2$).

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

Some implementations of the disclosed method further include the signed identifier is a location identifier. Further implementations include the location identifier as a logical location identifier. Other further implementations include the location identifier as a Universal Resource Name (URN). Some other implementations include the location identifier as a physical location identifier.

Some implementations of the disclosed method further include the scannable image includes a barcode. Further implementations include the barcode as a Quick Response (QR) code, a 3D barcode, or a Just Another Barcode (JAB) code.

Some implementations of the disclosed method further include publishing the scannable image online.

Some implementations of the disclosed method further include publishing the scannable image on a tangible medium.

Some implementations of the disclosed method further include incorporating metadata into the scannable image. Further implementations of metadata includes a timestamp. Even further implementations include the timestamp correlating to a time where online assets are simultaneously owned by the owning entity. Further implementations of metadata include location data, or expiration time, or issuance time Some implementations of the disclosed method further include the set of resources including a tangible resource. Further implementations include the tangible resource is part of a fixed geographic region. Other implementations include the tangible resource being capable of mobility.

Some implementations of the disclosed method further include disposing of the private key after generating the set of assertions.

Some implementations of the disclosed method further include generating for posting on a first another resource (e.g., $R_2$) a first another scannable image that encapsulates a first another resource self-assertion that includes a first another self-reference to the first another resource, and the public key for the first another resource, and a first another set of assertions to each resource in the set of resources except for the first another resource, wherein each assertion in the first another set of assertions includes another respective reference to the respective another resource, and a signed reference to the first another resource that is generated using the private key of the current resource or another respective resource (e.g. $R_{3-n}$).

Further implementations include generating for posting on a second another resource (such as $R_3$) a second another scannable image that encapsulates the public key for the second another resource and a set of assertions for the current resource (such as $R_1$) and each other another resource in the set of online resources, wherein each assertion for the current resource and each other another resource includes a signed reference to the second another resource that is generated using the private key of the current resource, the first another resource (such as $R_2$), or a third another resource (such as $R_4$).

Some implementations involve the set of assertions for each other resource further include a private field that indicates or states whether a consumer requires a key other than the public keys and private keys in the key pairs to decrypt the addr field.

Some particular implementations and features for verifying image tags are described in the following discussion.

In one disclosed implementation, the method includes visiting a first resource using a first location identifier, ingesting, from the first resource, a first scannable image that contains a first plurality of assertions of ownership of online resources by a single entity, including: a first self-assertion of ownership of the first resource including a first signed self-location identifier; and a second complementary assertion of ownership of a second resource including a second signed remote location identifier, extracting a first public key of the first resource, visiting the second resource using a second location identifier, ingesting, from the second resource, a second scannable image that contains a second plurality of assertions, including: a first complementary assertion of ownership of the first resource including a first signed remote location identifier; and a second self-assertion of ownership of the second resource including a second signed self-location identifier; extracting a second public key of the second resource, verifying, using the first public key, the signature from the first complementary assertion, verifying, using the second public key, the signature from the second complementary assertion, and determining, based on the pair of verifications, a verification result of whether the resources are owned by a single entity.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

Some implementations of the disclosed method further include the first complementary assertion is signed by a first private key, and the second complementary assertion is signed by a second private key.

Some implementations of the disclosed method further include at least one of the first or the second resource is a tangible resource. Further implementations include wherein the tangible resource is part of a fixed geographical location. Other further implementations include the tangible resource having capability of mobility.

Some implementations of the disclosed method further include one of the signed identifiers includes a location identifier. Further implementations include the location identifier includes a logical-location identifier. Other implementations include the location identifier includes a physical-location identifier.

Some implementations of the disclosed method further include one of the scannable images includes a bar. Further implementations include the barcode as a Quick Response (QR) code, a 3D barcode, or a Just Another Barcode (JAB) code.

Some implementations of the disclosed method further include one of the scannable images was published online.

Some implementations of the disclosed method further include one of the scannable images was published on a tangible medium.

Some implementations of the disclosed method further include visiting a third resource using a third location identifier, ingesting, from the third resource, a third scannable image that contains a third plurality of assertion, including: a third self-assertion to the third resource; and a third complimentary assertion to the first resource, wherein the first scannable image further includes a fourth assertion complimentary assertion to the third resource. Further implementations include the basis of verification result further including pairwise analysis between assertion related to the first and third resource.

In some implementations of the disclosed method ingesting the first resource occurs by a camera.

In some implementations of the disclosed method, ingesting the first resource occurs by a web browser plugin. In some further implementations, ingesting, from the first resource, a first scannable image, extracting a first public key, visiting the second resource, ingesting a second scannable image, extracting a second public key, verifying a signature from the first complementary assertion, and verifying a signature from the second complementary assertion is performed automatically or without human input.

In some implementations of the disclosed method, the first set of assertions further includes an addr field, and visiting a second resource occurs after decrypting the addr field using a key. In some implementations, the key is not any of public keys or private keys used to generate the scannable image.

Other implementations of the methods described in this section can include a tangible non-transitory computer-readable storage medium storing program instructions loaded into memory that, when executed on processors cause the processors to perform any of the methods described above. Yet another implementation of the methods described in this section can include a device including memory and one or more processors operable to execute computer instructions, stored in the memory, to perform any of the methods described above.

Any data structures and code described or referenced above are stored according to many implementations on a computer readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A computer-implemented method of verifying, in pairwise manner, proof of ownership-association of decentralized online resources owned by or affiliated with a single entity, the method including:
   visiting a first resource using a first location identifier;
   ingesting, from the first resource, a first scannable image that contains a first plurality of assertions of ownership of online resources by a single entity, including:
      a first self-assertion of ownership of the first resource including a first signed self-location identifier; and
      a second complementary assertion of ownership of a second resource including a second signed remote location identifier;
   extracting a first public key of the first resource;
   visiting the second resource using a second location identifier;
   ingesting, from the second resource, a second scannable image that contains a second plurality of assertions, including:
      a first complementary assertion of ownership of the first resource including a first signed remote location identifier; and
      a second self-assertion of ownership of the second resource including a second signed self-location identifier;
   extracting a second public key of the second resource;
   verifying, using the first public key, a signature from the first complementary assertion;
   verifying, using the second public key, a signature from the second complementary assertion; and
   determining, based on the verifying the signature from the first complementary assertion and the verifying the signature from the second complementary assertion, a verification result of whether the first resource and second the resource are owned by a single entity.

2. The method of claim 1, wherein the first complementary assertion is signed by a first private key, and the second complementary assertion is signed by a second private key.

3. The method of claim 1, wherein one of the first signed remote location identifier or the second signed remote location identifier comprises a Universal Resource Name (URN).

4. The method of claim 1, wherein one of the first scannable image or the second scannable image includes a barcode.

5. The method of claim 4, wherein the barcode includes a QR code.

6. The method of claim 1, further including:
   visiting a third resource using a third location identifier;
   ingesting, from the third resource, a third scannable image that contains a third plurality of assertions, including:
      a third self-assertion to the third resource; and
      a third complimentary assertion to the first resource;
   wherein the first scannable image further includes a fourth complimentary assertion to the third resource.

7. The method of claim 6, wherein a basis of the verification result further includes: pairwise analysis between assertion related to the first resource and the third resource.

8. The method of claim 1, wherein ingesting the first resource occurs by a camera.

9. The method of claim 1, wherein ingesting the first resource occurs by a web browser plugin.

10. A non-transitory computer readable storage medium impressed with computer program instructions to verify, in pairwise manner, proof of ownership-association of decentralized online resources owned by or affiliated with a single entity, the instructions, when executed on a processor, implement a method comprising:
   visiting a first resource using a first location identifier;
   ingesting, from the first resource, a first scannable image that contains a first plurality of assertions of ownership of online resources by a single entity, including:
      a first self-assertion of ownership of the first resource including a first signed self-location identifier; and
      a second complementary assertion of ownership of a second resource including a second signed remote location identifier;
   extracting a first public key of the first resource;
   visiting the second resource using a second location identifier;
   ingesting, from the second resource, a second scannable image that contains a second plurality of assertions, including:
      a first complementary assertion of ownership of the first resource including a first signed remote location identifier; and
      a second self-assertion of ownership of the second resource including a second signed self-location identifier;
   extracting a second public key of the second resource;
   verifying, using the first public key, a signature from the first complementary assertion;
   verifying, using the second public key, a signature from the second complementary assertion; and
   determining, based on the verifying the signature from the first complementary assertion and the verifying the signature from the second complementary assertion, a verification result of whether the first resource and the second resource are owned by a single entity.

11. The non-transitory computer readable storage medium of claim 10, wherein the first complementary assertion is signed by a first private key, and the second complementary assertion is signed by a second private key.

12. The non-transitory computer readable storage medium of claim 10, wherein one of the first signed remote location identifier or the second signed remote location identifier comprises a Universal Resource Name (URN).

13. The non-transitory computer readable storage medium of claim 10, wherein one of the first scannable image or the second scannable image includes a barcode.

14. The non-transitory computer readable storage medium of claim 13, wherein the barcode includes a QR code.

15. The non-transitory computer readable storage medium of claim 10, implementing the method further comprising:
    visiting a third resource using a third location identifier;
    ingesting, from the third resource, a third scannable image that contains a third plurality of assertions, including:
        a third self-assertion to the third resource; and
        a third complimentary assertion to the first resource;
    wherein the first scannable image further includes a fourth complimentary assertion to the third resource.

16. The non-transitory computer readable storage medium of claim 15, wherein a basis of the verification result further comprises: pairwise analysis between assertions related to the first resource and the third resource.

17. The non-transitory computer readable storage medium of claim 10, wherein ingesting the first resource occurs by a camera.

18. The non-transitory computer readable storage medium of claim 10, wherein ingesting the first resource occurs by a web browser plugin.

19. A system including one or more processors and a memory, the memory loaded with computer instructions to verify, in pairwise manner, proof of ownership-association of decentralized online resources owned by or affiliated with a single entity, the instructions, when executed on the one or more processors, implement actions comprising:
    visiting a first resource using a first location identifier;
    ingesting, from the first resource, a first scannable image that contains a first plurality of assertions of ownership of online resources by a single entity, including:
        a first self-assertion of ownership of the first resource including a first signed self-location identifier; and
        a second complementary assertion of ownership of a second resource including a second signed remote location identifier;
    extracting a first public key of the first resource;
    visiting the second resource using a second location identifier;
    ingesting, from the second resource, a second scannable image that contains a second plurality of assertions, including:
        a first complementary assertion of ownership of the first resource including a first signed remote location identifier; and
        a second self-assertion of ownership of the second resource including a second signed self-location identifier;
    extracting a second public key of the second resource;
    verifying, using the first public key, a signature from the first complementary assertion;
    verifying, using the second public key, a signature from the second complementary assertion; and
    determining, based on the verifying the signature from the first complementary assertion and the verifying the signature from the second complementary assertion, a verification result of whether the first resource and the second resource are owned by a single entity.

20. The system of claim 19, further implementing actions comprising:
    visiting a third resource using a third location identifier;
    ingesting, from the third resource, a third scannable image that contains a third plurality of assertions, including:
        a third self-assertion to the third resource; and
        a third complimentary assertion to the first resource;
    wherein the first scannable image further includes a fourth complimentary assertion to the third resource.

* * * * *

UNITED STATES PATENT AND TRADEMARK OFFICE
CERTIFICATE OF CORRECTION

| | | |
|---|---|---|
| PATENT NO. | : 12,143,503 B2 | Page 1 of 1 |
| APPLICATION NO. | : 17/956706 | |
| DATED | : November 12, 2024 | |
| INVENTOR(S) | : David Luna | |

It is certified that error appears in the above-identified patent and that said Letters Patent is hereby corrected as shown below:

In the Claims

Column 13, Line number 64 (Claim 1), reads:
"second the resource are owned by a single entity."

Should read:
--the second resource are owned by a single entity.--

Column 14, Line number 20 (Claim 7), reads:
"assertion related to the first resource and the third resource."

Should read:
--assertions related to the first resource and the third resource.--

Signed and Sealed this
First Day of April, 2025

Coke Morgan Stewart
*Acting Director of the United States Patent and Trademark Office*